United States Patent

[11] 3,593,166

[72] Inventor William H. Martin, Jr.
Morristown, N.J.
[21] Appl. No. 885,807
[22] Filed Dec. 17, 1969
[45] Patented July 13, 1971
[73] Assignee Bell Telephone Laboratories, Incorporated
Murray Hill, N.J.

[54] ZERO CROSSING DETECTOR
5 Claims, 2 Drawing Figs.

[52] U.S. Cl. .... 328/150, 328/30, 307/235
[51] Int. Cl. .... H03k 17/00
[50] Field of Search .... 328/150, 135, 30; 307/261, 231, 235

[56] References Cited

UNITED STATES PATENTS

| | | | |
|---|---|---|---|
| 2,448,718 | 9/1948 | Koulicovitch | 328/150 |
| 3,278,685 | 10/1966 | Harper | 307/231 X |

*Primary Examiner*—Donald D. Forrer
*Assistant Examiner*—B. P. Davis
*Attorneys*—R. J. Guenther and E. W. Adams, Jr.

ABSTRACT: A pulse of controllable width is emitted from a pulse divider in response to each zero crossing of an input signal. The input signal polarity is sensed, and a separate gate for each polarity gates pulses from a clock oscillator to the pulse divider in response to the termination of that particular input polarity. The pulse divider produces one pulse out for a fixed even number of clock pulses received, and a flip-flop alternately disables each gate to block the clock pulses after one output pulse. The clock oscillator frequency and the pulse division rate determine the output pulse width.

INVENTOR
W. H. MARTIN, JR
BY John P. McDonnell
ATTORNEY

ZERO CROSSING DETECTOR

BACKGROUND OF THE INVENTION

This invention concerns the field of analysis of AC signals and in particular the detection of zero crossings.

As more and more signal analysis is performed digitally, the accurate detection of zero crossings becomes more essential. Zero crossing detectors are of course not new. One typical example consists of merely a pair of oppositely poled diodes feeding a NOR gate. The NOR gate produces an output when neither diode is conducting hence when the input signal is neither positive nor negative. Such a detector, however, has several limitations. The amplitude, width and waveshape of the output signal are not well controlled, nor is its exact time relationship to the input signal. The waveform and frequency of the input signal can affect all of these output characteristics. In some applications, such a detector is simply inadequate. In circuits which depend upon the coincidence of two zero crossings, for example, since exact coincidence rarely exists, the degree of coincidence must be defined. That is, the range of time difference between actual zero crossings over which the circuit will give a coincidence indication must be controlled. The zero crossing detector of the present invention is particularly useful for such circuits.

An object of this invention is to produce a pulse of controlled adjustable duration in response to each zero crossing of an input signal.

Another object is to produce an output pulse within a predetermined time period after each zero crossing of an input signal and an indication of the polarity of the input signal between output pulses.

A third object is to provide a zero crossing detector that is readily implemented by integrated circuit techniques.

SUMMARY OF THE INVENTION

In the zero crossing detector of the present invention, the polarity of the input signal is sensed, and pulses from a clock oscillator are gated to a pulse divider in response to termination of a given input polarity. The pulse divider produces one output pulse in response to a predetermined even number of pulses from the clock oscillator, and a reset circuit blocks the clock pulses upon completion of one output pulse. The output pulse width is therefore controlled by the clock oscillator frequency and the pulse division rate. A second gate may be employed responsive to the termination of the opposite polarity input, and the reset circuit may alternately block and reset the two gates in phase opposition to detect both positive going and negative going zero crossings. Finally, a second pair of gates, located between the polarity sensors and the first pair of gates, and enabled by the reset circuit, may provide convenient polarity output signals that are blocked during the zero crossing output pulses.

DETAILED DESCRIPTION

Figure 1:
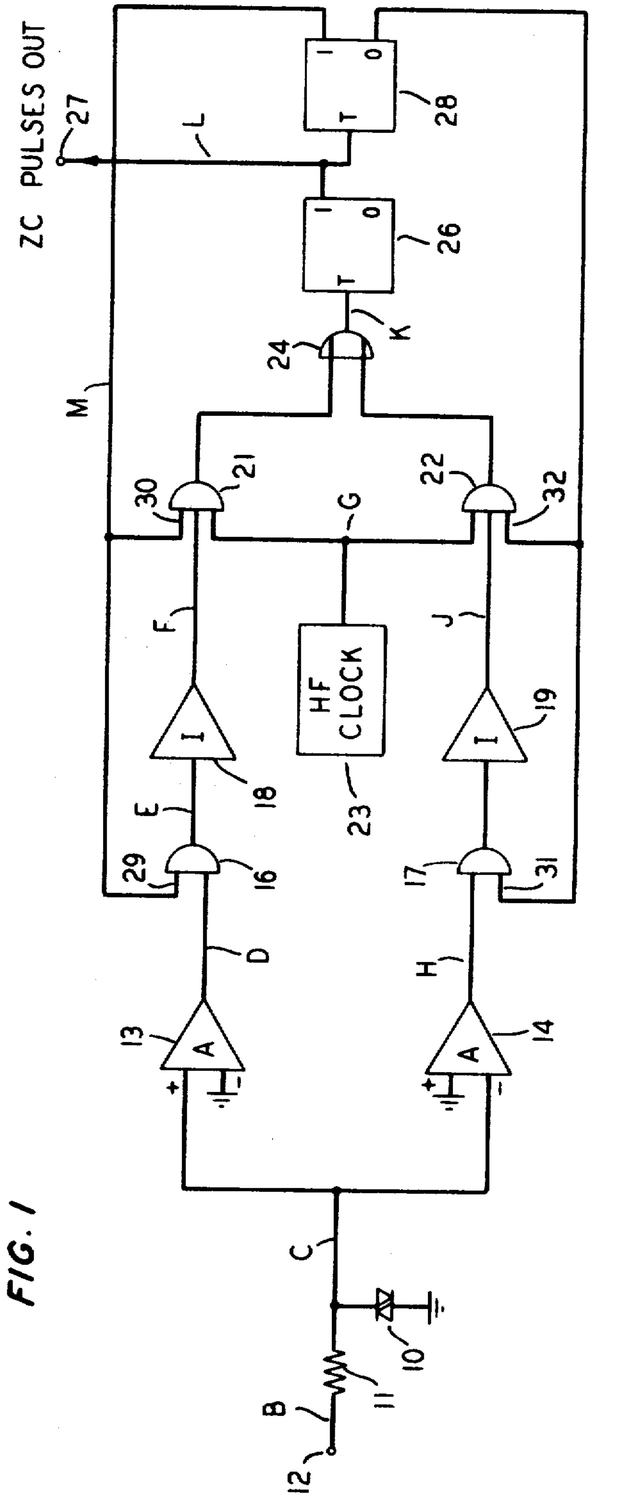
FIG. 1 is a partly schematic and partly block diagram of a particularly useful embodiment of the invention.

In the embodiment of FIG. 1, a varistor 10 and a resistor 11 are connected in series between an input terminal 12 and ground. The junction between varistor 10 and resistor 11 is connected to the inputs of a pair of oppositely poled operational amplifiers 13 and 14. The outputs of amplifiers 13 and 14 are connected to an input of a pair of AND gates 16 and 17, respectively, and the outputs of the AND gates are connected through a pair of signal inverters 18 and 19, respectively, to an input of a second pair of AND gates 21 and 22, respectively. The output of a high frequency clock oscillator 23 is connected to a second input of each AND gate 21 and 22. The outputs of AND gates 21 and 22 are each connected to a separate input of an OR gate 24. The output of OR gate 24 is connected to the toggle input of a first flip-flop 26 and the "1" output of flip-flop 26 is connected to an output terminal 27 and the toggle input of a second flip-flop 28. The "1" output of flip-flop 28 is connected to a second input 29 of AND gate 16 and a third input 30 of AND gate 21 and the "0" output of flip-flop 28 is connected to a second input 31 of AND gate 17 and a third input 32 of AND gate 22.

Figure 2:
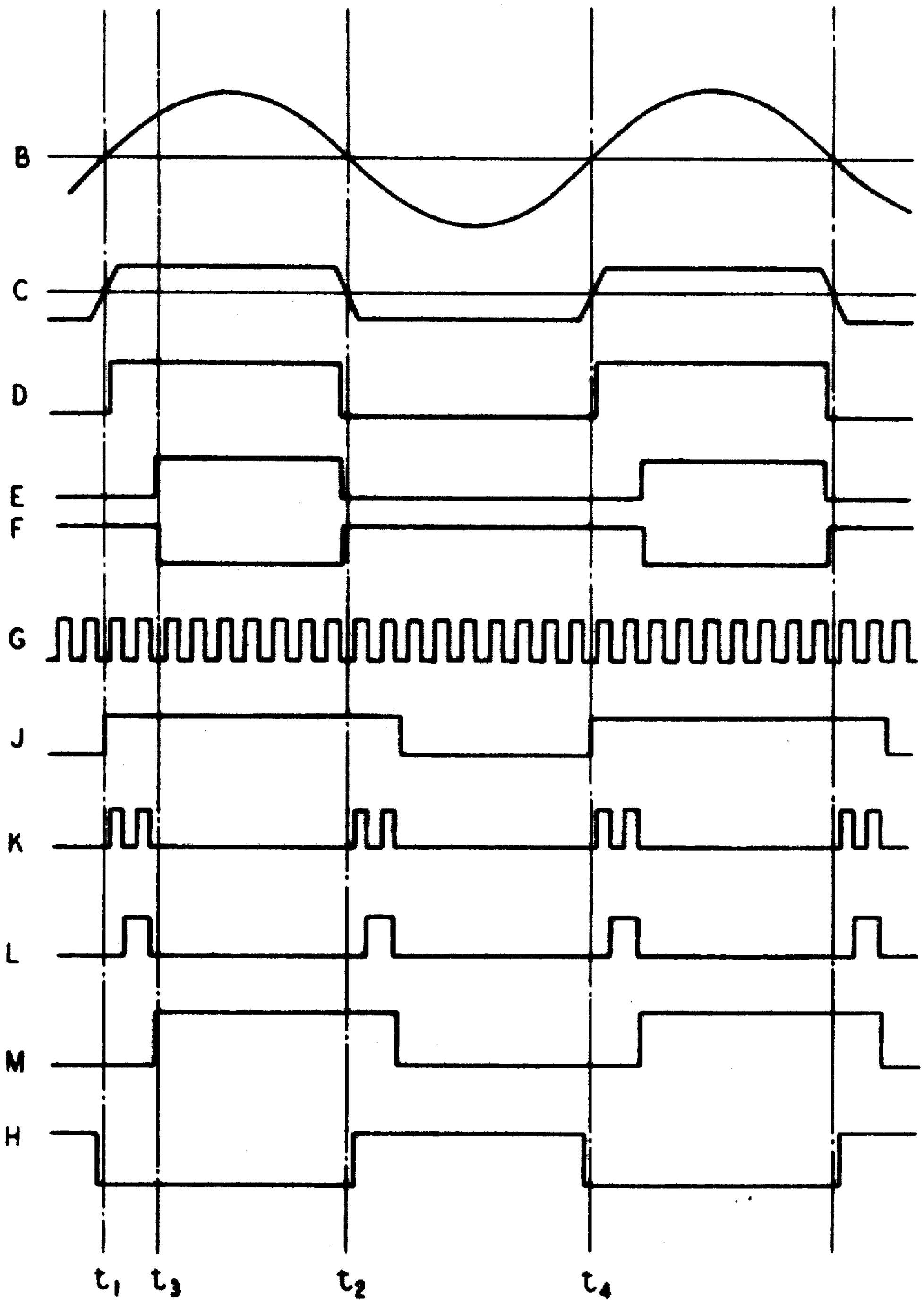
FIG. 2 is a set of waveforms useful in the explanation of the operation of the embodiment of FIG. 1.

The operation of the circuit will be explained with reference to the voltage waveforms of FIG. 2. Each waveform is identified by a letter; the point in the circuit at which each waveform is taken is identified in FIG. 1 by the same letter that identifies the corresponding waveform in FIG. 2. To illustrate the time relationships all of the waveforms are drawn against a common time abscissa although the vertical voltage scales differ.

The signal that is to be analyzed by a detection of its zero crossings is fed between terminal 12 and ground. It is shown in waveform B as a simple sine wave for clarity of illustration only; the invention will operate satisfactorily with almost any input waveshape. Varistor 10 serves to symmetrically clip the signal to a very low level as shown in waveform C to avoid overloading operational amplifiers 13 and 14, which in turn serve to greatly amplify the positive and negative portions of the signal, respectively. Although the amplifiers are not necessary to the practice of the invention, they provide a useful voltage of identifiable polarity as close in time before and after the actual zero crossing as is practical to achieve. This greatly increases the accuracy of the zero crossing detection. A close comparison of waveforms B and D reveals that waveform D from operational amplifier 13 rises slightly after $t_1$ and falls slightly before $t_2$, the actual times of the first and second zero crossings, respectively, of the input waveform B. This assumes that the frequency response of the amplifiers is greater than the input frequency so that the amplifier output follows the input waveform. This slightly shorter duration of the positive portions of waveform D is caused by the small but finite amount of input voltage needed to produce an amplifier output. As will be shown later, flip-flop 28 is in a " " condition until time $t_3$, at which it is switched to a "1" condition. With both inputs to AND gate 16 raised at time $t_3$, its output waveform E is raised, and the inverted output waveform F is dropped. Thus, although input 30 to AND gate 21 is raised, gate 21 is still not enabled. When operational amplifier 13 output waveform D drops just prior to the zero crossing at time $t_2$, the output of AND gate 16 drops, raising the output of inverter 18. At that point, AND gate 21 is enabled to start passing pulses from clock oscillator 23, waveform G, through OR gate 24 to the toggle input of flip-flop 26. Flip-flop 26 acts as a divide-by-two pulse divider, producing one pulse out for every two pulses in. The first clock pulse switches flip-flop 26 to a "1" condition, starting an output pulse and setting the toggle input of flip-flop 28. The second clock pulse switches flip-flop 26 to a "0" condition, terminating the output pulse and switching flip-flop 28 to a "0" condition. With the "1" output of flip-flop 28 turned off, AND gate 21 is disabled so that only two clock pulses are passed to flip-flop 26, and only one output pulse is emitted from terminal 27.

The following half cycle operates similarly. Shortly after the zero crossing at time $t_2$, as the input signal exceeds a small finite negative voltage, the output of operational amplifier 14, waveform H rises to enable AND gate 17. All during the production of the output pulse that corresponds to the zero crossing at time $t_2$, as previously described, flip-flop 28 is in a "1" condition keeping AND gate 17 turned off through its input 31. When the $t_2$ zero crossing pulse is finished, and flip-flop 28 switches to a "0" condition, AND gate 17 is turned on, dropping the output of inverter 19, waveform J, and at the same time raising input 32 of AND gate 22. Gate 22 is therefore reset, ready to pass clock pulses to OR gate 24 as soon as the output of operational amplifier 14 drops just prior to the zero crossing at time $t_4$. The logic sequence with respect to the clock pulses into flip-flops 26 and 28 is a repeat of that described earlier; just two clock pulses are passed to flip-flop 26 and just one output pulse is emitted.

It should be noted that the time that elapses between the enabling of AND gate 21, or AND gate 22 by inverter 18 or 19, respectively, and the passing of the first clock pulse to OR gate 24 is completely random. It varies from zero to one-half of the clock oscillator period. If AND gate 21 or 22 is enabled during the positive part of the clock cycle, the AND gate output rises immediately, and the first clock pulse fed into flip-flop 26 is a short one. In consideration of this fact, flip-flop 26 has been chosen to be operative upon negative going input pulses. The pulse width of the output pulses from terminal 27, therefore, is equal to just one full period of the clock oscillator, and the width of the output pulses may be adjusted by varying the clock oscillator frequency. If the logic gates were poled to pass negative pulses, flip-flop 26 would be chosen to be operative on positive going pulses. The ability to vary output pulse width can be very useful when two zero crossing detectors are used in setting the amount of overlap of output pulses caused by simultaneous zero crossings. The width of the clock pulses themselves is not critical but the dwell period between pulses must be long enough to allow operation of toggle flip-flop 28, AND gate 16 or 17, and inverter 18 or 19 after completion of the zero crossing pulse. If the inverter output does not fall before the rise of the next clock pulse, flip-flop 26 will toggle again to produce a false pulse at output 27.

If it is desired to have a more accurate time relationship between the appearance of the zero crossing output pulse and the actual zero crossing of the input signal, providing a smaller maximum time delay, the clock frequency can be raised to any value compatible with the operating times of the logic gates. The higher the frequency of the clock, the more accurate is the time relationship. The output pulse may then be stretched to the desired width by the use of additional toggle flip-flops or other pulse dividing circuits between OR gate 24 and toggle flip-flop 26. The addition of one flip-flop would produce a divide-by-four circuit and double the output pulse width; the addition of a divide-by-three pulse divider would produce a divide-by-six circuit and triple the pulse width.

It is often useful in signal analysis to have in addition to a pulse in response to each zero crossing, an output indicative of the instantaneous polarity of the input signal. The outputs of operational amplifiers 13 and 14, waveforms D and H, respectively, would appear to be well suited to this function. However, since some time is required to generate the output pulse after each zero crossing, the change in polarity is evidenced before the zero crossing pulse. That is, at time $t_2$, for instance, waveform D drops and waveform H rises to indicate the loss of positive input polarity and the beginning of negative input polarity before the pulse appears on waveform L to signal the zero crossing. This can upset a logic circuit that anticipates in chronological order the disappearance of the positive signal, the zero crossing pulse and the appearance of the negative signal. The inclusion of AND gates 16 and 17, however, each with an input connected to flip-flop 28 circumvents this illogical signal sequence. Each of these AND gates is held off by flip-flop 28 until after the completion of the zero crossing output pulse. Therefore, if the signal polarity indication is taken from the output of AND gates 16 and 17, positive polarity disappears and a zero crossing pulse is completed before the negative signal polarity appears.

Finally, it should also be noted that all of the blocks of FIG. 1 are easily produced by integrated circuit methods—flip-flops, logic gates, oscillators and amplifiers. Therefore, the whole circuit can be made very small and light and, in large volume, inexpensive.

What I claim is:

1. A zero crossing detector for producing an output pulse in response to a zero crossing of an input signal comprising first polarity sensing means connected to receive said input signal for producing an output when said input signal is of a first polarity, a clock oscillator for producing a series of timing pulses, a pulse divider for producing an output pulse in response to an even number of input pulses, first gating means having inputs connected to said clock oscillator and said first polarity sensing means respectively, and an output connected to said pulse divider for passing said timing pulses to said pulse divider in response to an absence of output from said first polarity sensing means, and reset means connected between said pulse divider and said first gating means for blocking said timing pulses in response to an output pulse from said pulse divider.

2. A zero crossing detector as in claim 1 including second polarity sensing means connected to receive said input signal for producing an output when said input signal is of a second polarity, and second gating means having inputs connected to said clock oscillator, said second polarity sensing means, and said reset means, respectively, and an output connected to said pulse divider for passing said timing pulses to said pulse divider in response to an absence of output from said second polarity sensing means, wherein said reset means alternately blocks and reset said first and second gating means in phase opposition in response to successive output pulses from said pulse divider.

3. A zero crossing detector as in claim 2 wherein said reset means comprises a toggle flip-flop having an input connected to the output of said pulse divider, a first output connected to an input of said first gating means, and a second output of opposite phase to said first output connected to an input of said second gating means.

4. A zero crossing detector as in claim 3 including a first AND gate having a first input connected to said first polarity sensing means, a second input connected to said toggle flip-flop first output and an output connected to said first gating means, and a second AND gate having a first input connected to said second polarity sensing means, a second input connected to said toggle flip-flop second output and an output connected to said second gating means whereby said first and second AND gates are disabled during said output pulses.

5. Apparatus for emitting a pulse at an output in response to each zero crossing of an AC input signal comprising rectifying means for emitting a first signal corresponding to the positive part of said AC input signal and a second signal corresponding to the negative part of said AC input signal; a first AND gate having a first input connected to receive said first signal, a second input and an output; a second AND gate having a first input connected to receive said second signal, a second input and an output; a first signal inverter connected to the output of said first AND gate; a second signal inverter connected to the output of said second AND gate; a clock oscillator for producing a series of uniform pulses; a third AND gate having a first input connected to the output of said first signal inverter, a second input connected to the output of said clock oscillator, a third input and an output for passing pulses from said clock oscillator when said three third AND gate inputs are enabled; a fourth AND gate having a first input connected to the output of said second inverter, a second input connected to the output of said clock oscillator, a third input and an output for passing pulses from said clock oscillator when said three fourth AND gate inputs are enabled; a first bistable multivibrator having a toggle input connected to the outputs of said third and fourth AND gates and an output connected to said output terminal; a second bistable multivibrator having a toggle input connected to said output terminal, a first output connected to the second input of said first AND gate and the third input of said third AND gate and a second output of opposite phase connected to the second input of said second AND gate and the third input of said fourth AND gate, whereby said third and fourth AND gates are inhibited after passing two pulses from said clock oscillator, and said first and second AND gates are inhibited during said output pulse.